Oct. 27, 1970   L. P. NORDHOLM   3,536,998
AUTOMATIC FUNCTION SELECTING AND SCALE SHIFTING VOLT-OHMMETER
Filed Sept. 13, 1966                                 2 Sheets-Sheet 1
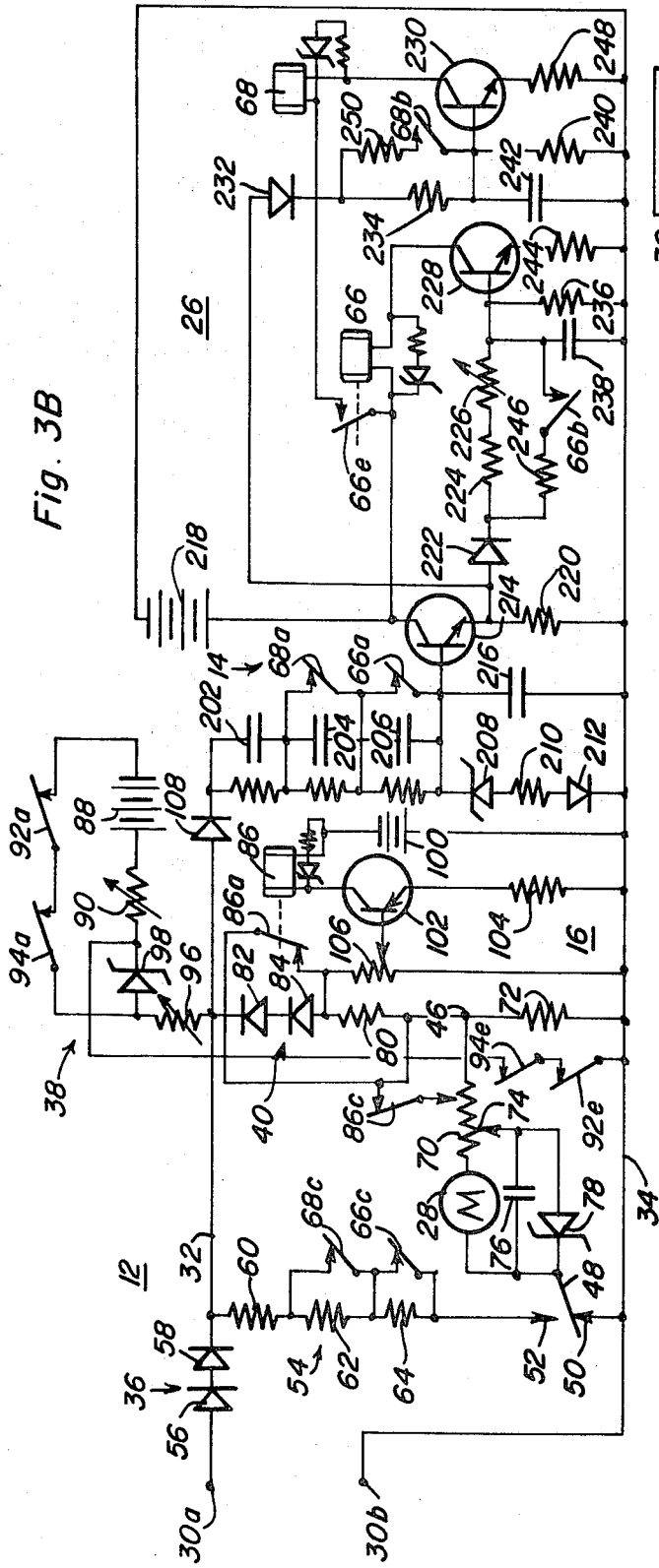
Fig. 3B
Fig. 1
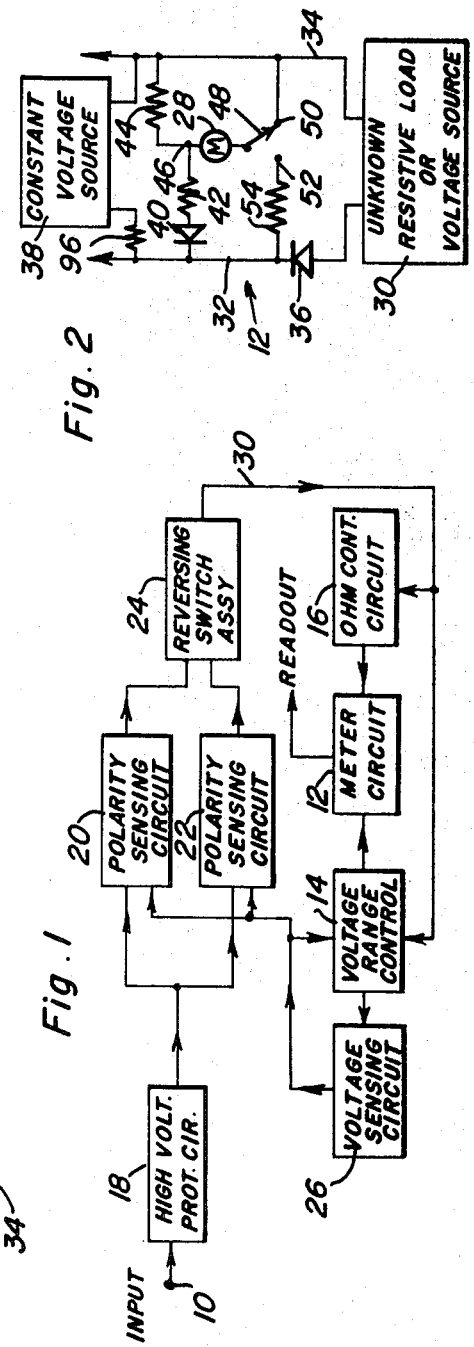
Fig. 2
Lloyd P. Nordholm
INVENTOR.
BY Clarence A. O'Brien
and Harvey B. Jacobson
Attorneys Oct. 27, 1970     L. P. NORDHOLM     3,536,998
AUTOMATIC FUNCTION SELECTING AND SCALE SHIFTING VOLT-OHMMETER
Filed Sept. 13, 1966     2 Sheets-Sheet 2

Lloyd P. Nordholm
INVENTOR.

BY *Clarence A. O'Brien*
and *Harvey B. Jacobson*
Attorneys

United States Patent Office 3,536,998
Patented Oct. 27, 1970

---

3,536,998
AUTOMATIC FUNCTION SELECTING AND SCALE SHIFTING VOLT-OHMMETER
Lloyd P. Nordholm, Binghamton, N.Y., assignor of fifty percent to Douglas A. Florance, Vestal, N.Y.
Filed Sept. 13, 1966, Ser. No. 579,043
Int. Cl. G01r 27/02, 15/12, 1/38
U.S. Cl. 324—62          11 Claims

ABSTRACT OF THE DISCLOSURE

A meter conducts current in opposite directions between voltage supply lines for volt meter and ohmmeter operation respectively. The meter circuit is switched between the two operational modes by a polarity sensing component dependent upon whether a load or a voltage source is connected across the input test terminals. The scale range of the meter is also changed by appropriate modification of the meter circuit in response to detection of voltage changes at the test terminals by a voltage sensing component.

---

This invention relates to apparatus for measuring electrical characteristics and more particularly to an automatic control circuit associated with a suitable read out device through which it is rendered operative to measure different electrical characteristics such as voltage, resistance, and current.

It is therefore a primary object of the present invention to provide a multipurpose electrical metering system that automatically shifts between voltmeter and ohmmeter operation. Although multipurpose meters have heretofore been designed for measuring both voltage and resistance, they have required manual adjustment in connection with any such change in operation or function. The control system of the present invention is however automatically operative to effect such change without any danger of damage to the circuit.

An additional object of this invention is to provide a multipurpose AC or DC measuring system without requiring any manual adjustment.

A further object of the present invention is to provide a meter control circuit which is automatically operative to change the scale of the meter for both voltmeter and ohmmeter operation.

A still further object of the present invention is to provide a meter control circuit which will indicate the presence of AC voltage, the polarity of the DC voltage being measured as well as the voltage range within which the meter is operating.

Yet another object of the present invention is to provide a meter control circuit operated by a low voltage DC source and having no moving parts subject to wear except for relays. The control circuit also requires no warm-up period nor is it subject to varying characteristics that require frequent readjustment. Also, the control circuit employs protective features which prevent overload and damage to any of the circuit components because of excessive voltage.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a schematic block diagram illustrating the meter control system associated with the present invention.

FIG. 2 is a simplified circuit diagram illustrating the meter circuit component associated with the system of the present invention;

FIGS. 3A, 3B and 3C are electrical circuit diagrams illustrating one specific embodiment of the meter control system.

Figure 3A:
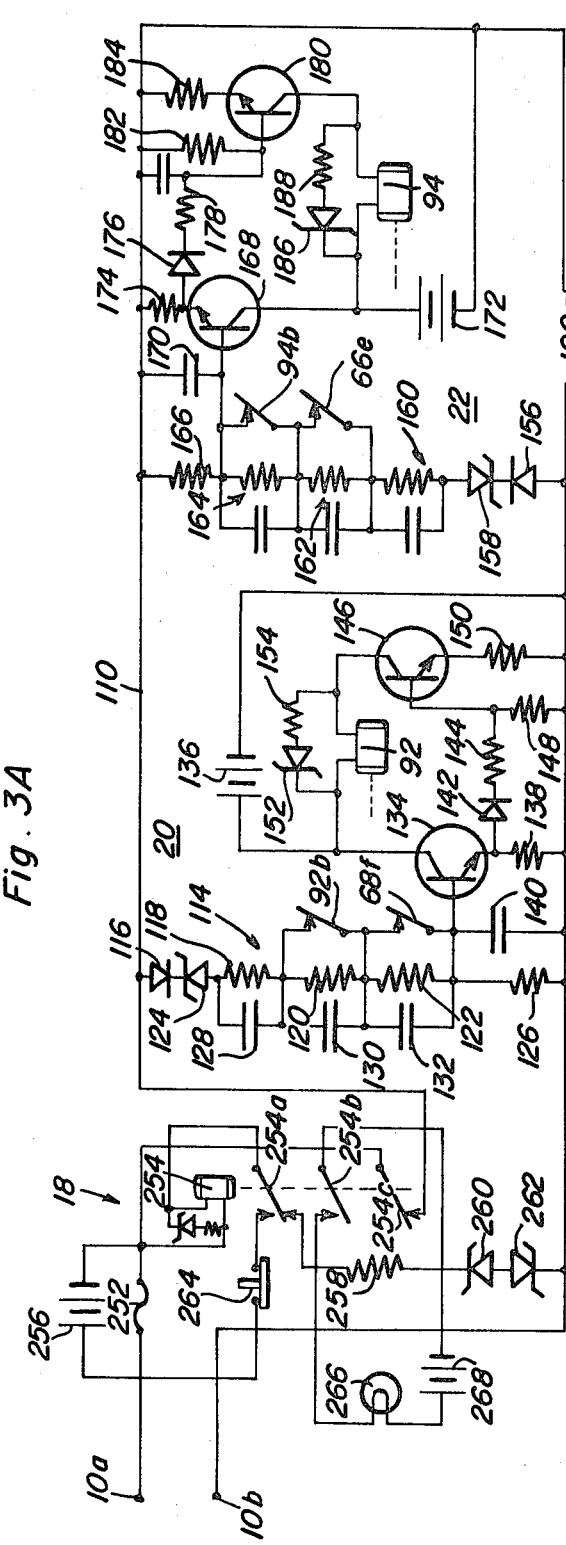

Referring now to the drawings in detail, FIG. 1 schematically depicts the meter control system for measuring an input at 10 obtained for example from an unknown source of voltage or an unknown resistive load. Readout is obtained from a meter circuit component 12 to which current is supplied from either a voltage range control component 14 or from an ohm control circuit component 16 dependent upon whether a voltage or a resistive load is connected to the input 10. The input 10 is therefore connected in parallel to the voltage control component 14 and ohm control circuit component 16 through a protective circuit component 18, a pair of polarity sensing circuit components 20 and 22 and a reversing switch assembly 24. Also connected to the input is a voltage sensing circuit component 26 through which the scale of the readout from the meter circuit component 12 is changed. For example, the meter circuit component 12 is operative under control of the voltage range control component 14 to provide a readout in one scale when supplied with an input up to 50 volts. When the voltage sensing circuit component 26 detects voltages between 50 and 200 volts, it is operative through the voltage range control component 14 to change the scale of the meter circuit readout from its low scale to its intermediate scale. When the input voltage exceeds 200 volts, the voltage sensing circuit 26 is operative through the voltage range control 14 to shift the meter circuit to its high scale. Similarly, the ohm control circuit is operative to change the readout scale of the meter circuit when the system is measuring a resistive load at the input terminal 10.

It will of course be appreciated that any number of scale ranges may be employed in connection with the system. Further, should the input voltage exceed the maximum voltage for which the system is designed, the input terminal 10 will be disconnected from the operating components by means of the high voltage protective circuit 18. Thus, as long as the input voltage is below the upper limit of the high scale range, such as 500 volts, the input voltage is supplied to the components 14, 16 and 26 through the reversing switch assembly 24 under control of the polarity sensing circuit. In this fashion, the meter control system is capable of handling either AC or DC voltages. A voltage of correct polarity for example will be sensed by the polarity sensing circuit 20 and pass through the reversing switch assembly 24 in the same direction. A voltage of opposite polarity however will be sensed by the polarity sensing circuit 22 which is then operative on the reversing switch assembly 24 to reverse the direction of the voltage before it is fed to the following components of the system. AC voltage which is rectified as hereafter explained, will operate both polarity sensing circuits while the reversing switch assembly is inoperative. Accordingly, a voltage in one direction only will be fed to components 14, 16 and 26 regardless of the polarity of the input voltage and whether or not it is AC or DC. Further, the voltage sensing circuit 26 is operatively connected to the polarity sensing circuit 20 and 22 in order to protect them against high voltages when the system is providing a readout in the high scale range.

As shown in FIG. 2, the simplified meter circuit 12 includes any suitable meter device 28 for measuring electrical current passing therethrough from which a readout is obtained. The meter circuit is therefore connected to either an unknown resistive load or an unknown voltage source as hereinbefore indicated through terminal means 30. The input is therefore supplied from terminal means 30 to a pair of supply lines 32 and 34 in the meter circuit. A unidirectional conducting device 36 is connected in the supply line 32 in order to conduct current in the direction in which it is passed by the reversing switch assembly 24 as aforementioned in connection with FIG. 1. Also connected to the voltage supply lines 32 and 34, is a constant voltage source 38 from which a relatively low DC voltage is supplied whenever the terminal means 30 is connected to a resistive load, the constant voltage source being disconnected from the supply lines whenever a voltage is applied to the terminal means 30. Connected across the supply lines 32 and 34, is a second unidirectional conducting device 40 in series with a voltage dividing network diagrammatically shown by resistors 42 and 44. One terminal of the meter 28 is effectively connected to the juncture 46 between the resistors 42 and 44, while the other terminal thereof is connected to the switch device 48 through which the meter is rendered operative either as a voltmeter or an ohmmeter. The switch device 48 is therefore displaceable between two operative positions engaging the contacts 50 and 52, contact 50 being connected to the supply line 334 while the contact 52 is connected to the supply line 32 through a resistive network 54. When the meter circuit is functioning as an ohmmeter, the switch device 48 engages the contact 50 as shown in FIG. 2 so that the meter 28 is connected in parallel with the resistor 44 and in series with the resistor 42 and the unidirectional conducting device 40 between the supply lines 32 and 34. Current is then conducted from line 34 to line 32 through the meter 28 in one direction from the constant voltage source determined by the unidirectional conducting device 40, while the volt drop across the meter will be determined by the resistor 42 in order to establish the proper readout scale for ohmmeter operation. When the terminal means 30 is supplied with a voltage, the constant voltage source 38 is automatically disconnected and the switch 48 automatically displaced to its other operative position by means not shown in FIG. 2 for sake of clarity but to be hereafter described. Current is then conducted from line 32 to line 34 through the meter 28 from the unidirectional conducting device 36 in a direction opposite to the direction in which the current is conducted during ohmmeter operation. Accordingly, during voltmeter operation, the meter 28 is connected in series between the resistive network 54 and resistor 44 across the supply lines 32 and 34 because the switch device 48 is then engaged with the contact 52. The resistor 44 together with the resistive network 54 will then determine the volt drop across the meter 28 and hence the readout scale. By changing the resistance of the network 54, as will be hereafter explained, the readout scale of the meter may be automatically changed.

Referring now to the specific meter circuit 12 in FIG. 3B, it will be observed that the terminals 30a, 30b of the terminal means 30 are connected to the meter circuit through the unidirectional device 36 consisting of a pair of series connected diodes 56 and 58. When the switch device 48 engages the contact 52 during volt meter operation, the meter 28 is connected to the supply line 32 through the resistive network 54 consisting of the series connected resistors 60, 62 and 64, with normally closed relay switches 66c and 68c selectively shunting resistors 64 and 62. The meter 28 is also connected to the voltage supply line 34 through the resistance of potentiometer 70 in series with the fixed resistor 72 corresponding to the resistor 44 described in connection with FIG. 2. Connected between the terminal of the meter 28 to which the switch device 48 is connected and the adjustable arm 74 of the potentiometer 70, is a relatively high capacitor 76 operative to slow down inrush current and thereby eliminate rapid movement of the meter pointer. Also connected in parallel with the capacitor 76, is a Zener diode 78 which will avalanche and pass all excess current around the meter to prevent burn out and voltage buildup on the meter resulting from reversal in flow of current therethrough when the system automatically switches between voltmeter and ohmmeter operation.

During ohmmeter operation, the switch device 48 connects one terminal of the meter 28 to the voltage supply line 34 through the contact 50. The other terminal of the meter is then connected by potentiometer 70 to the juncture point 46 between the resistors 72 and 80 of the voltage dividing network which is connected to the voltage supply line 32 through the diodes 82 and 84 of the unidirectional conducting device 40 while the normally closed relay switches 86a and 86c are opened. The meter circuit is thereby conditioned for ohmmeter operation when a relatively high resistive load is applied to the terminals 30a and 30b by energization of the relay coil 86 associated with the relay switches 86a and 86c. When the resistive load being measured by the meter circuit is reduced to a predetermined value, the relay coil 86 is deenergized as will be hereafter explained causing the relay switches 86a and 86c to close as shown in FIG. 3B. The relay switch 86a is then operative to shunt the resistor 80 while the relay switch 86c is operative to partially shunt the resistance of potentiometer 70 in order to change the readout scale of the meter 28. The foregoing operation of the meter circuit occurs however only when the voltage is supplied to the supply lines 32 and 34 from the constant voltage source 38.

The constant voltage source 38 includes a relatively low DC voltage battery 88, the positive terminal of which is connected through the adjustable resistor 90 and the normally closed relay switches 94e and 92e to the voltage supply line 34. The negative terminal of battery 88 on the other hand is connected to the voltage supply line 32 through the series connected, normally closed relay switches 92a and 94a and adjustable resistor 96. The voltage applied to the lines 32 and 34 is regulated by means of the adjustable resistors 90 and 96 and stabilized by the Zener diode 98 connected across the battery 88 in series with the resistor 90. Also, whenever any input voltage appears across the terminal 30a and 30b, one of the relay switches 92, 94a, 92e, 94e, will be opened in order to disconnect the constant source of voltage from the supply lines 32 and 34.

The relay coil 86 through which the readout scale of the meter is changed during ohmmeter operation, is energized from a battery source of voltage 100 under control of a PNP transistor 102, the emitter of which is connected to line 34 through the emitter resistor 104. Thus, one terminal of the relay coil 86 is connected to the negative terminal of the battery 100 while the other terminal thereof is connected to the collector of the transistor 102 rendered conductive during ohmmeter operation in order to energize the relay coil 86. Thus, during ohmmeter operation when current is conducted through the diodes 82 and 84, a volt drop will appear across the potentiometer 106 connected between the voltage line 34 and the diode 84 in order to establish a proper bias on the base of the transistor 102 so as to switch it on whenever an open circuit or a relatively high resistive load parallels the voltage dividing network. When the external resistance paralleling the voltage dividing network decreases by a predetermined amount, the negative bias established on the base of transistor 102 is reduced to cut-off value because of the reduction in base current conducted through the voltage dividing network due to the voltage drop in resistor 96 resulting from current flow through the external resistance. The relay coil 86 is then deenergized in order to close the relay switches 86a and 86c associated therewith for changing the meter readout scale as aforementioned. When the external resistance applied to the terminals 30a and 30b is removed, the voltage across the resistor 106 increases in order to reset the ohm control circuit to the maximum ohm scale.

The input voltage being measured by the meter circuit 12 must be of the proper polarity established by the diodes 56 and 58 rated above the maximum voltage of the system, opposite to the polarity of the constant circulating voltage supplied to the ohm control circuit 16 as established by the diodes 82 and 84 aforementioned. Accordingly, during voltmeter operation the unidirectional conducting device 40 will prevent the ohm circuit 16 from having any effect on the meter circuit 12 or the components connected to the voltage lines 32 and 34 through the diode 108 as shown in FIG. 3B. The device 36 rectifies AC voltage supplied to terminals 30a and 30b and includes the two series diodes 56 and 58 as a safety factor to prevent AC voltage from being applied to the transistors should one of the diodes break down. Also, because of the unidirectional characteristics of the device 36, no voltage will appear across lines 32 and 34 where there is a reverse voltage input until the reversing switch assembly 24 is operating.

The polarity sensing circuit 20 includes a voltage dividing network 114 connected across the supply lines 110 and 112 including the diode 116, in series with the resistors 118, 120 and 122, Zener diode 124 and resistor 126. The resistors 118, 120 and 122 are connected in parallel with capacitors 128, 130 and 132 while the resistors 120 and 122 are also selectively shunted by normally closed relay switches 92b and 68f. The capacitors 128, 130 and 132 serve two functions. They form a reactance paralleling resistors 118, 120 and 122 to provide half-wave rectification with a lower average impedance value in order to equalize AC and DC scale shifting. Also, together with capacitor 140, AC ripple is filtered. The foregoing arrangement may be utilized also for the voltage dividing networks in circuit components 22, 12 and 14. It will be apparent therefore that current will be conducted in one direction through the voltage dividing network 114 determined by the diode 116 in order to establish a positive forward bias on the base of NPN transistor 134 disposed in an emitter follower arrangement. The base of the transistor 134 is therefore connected to the juncture between resistors 122 and 126. The Zener diode 124 is connected between diode 116 and resistor 118 and is operative to set the firing point for the transistor and to prevent flow of current through the network 114 until the threshold value of the Zener diode is reached in order to prevent readout of the meter 28 during ohmmeter operation. Thus, when a relatively low voltage of proper polarity appears across the supply lines 110 and 112, the transistor 134 is switched on in order to conduct current from the positive terminal of the battery 136 to the supply line 112 through emitter resistor 138. The capacitor 140 connected between line 112 and the base of the transistor 134 is of a relatively high value to prevent transients and rapid build up of voltage on the base and to hold base voltage during AC rectified input and momentary opening of the circuit. An output signal at the emitter is fed through diode 142 and coupling resistor 144 to the base of power transistor 146. The base of the transistor 146 is maintained at a proper potential above the voltage supply line 122 by the resistor 148 so that it may be switched on by the signal output of the transistor 134. Proper potential is maintained on the emitter of transistor 146 by resistor 150 while its collector is connected to one terminal of the relay coil 92, the other terminal being connected to the positive terminal of battery 136. High transient voltages are prevented from being applied across the transistors by means of the Zener diode 152 in series with resistor 154 connected across the terminals of the relay coil 92.

Thus, a low voltage of proper polarity is detected by energization of the relay coil 92. When the relay coil 92 is energized, it opens the normally closed relay switch 92b to remove the shunt from the RC network 120-130. The relay 92 remains energized even though there is a drop in base voltage because less hold-in current is required. The additional resistance of resistor 120 permits higher incoming voltage across the network 114 without damage to the circuit components. When energized the relay coil 92 is also operative to open relay switch 92a associated with the constant source of voltage 38 and opens the relay switch 92e to disconnect the constant power source from the meter circuit. Switch device 48 is also displaced by means of the energized relay coil 92 or 94 in the polarity sensing circuit 22 for voltmeter operational purposes.

The polarity sensing circuit 22 is similar in arrangement and operation to the polarity sensing circuit 20 except for detecting a voltage of opposite or incorrect polarity across the voltage supply lines 110 and 112. The circuit 22 therefore also includes a voltage dividing network consisting of the series connected diode 156 connected to the line 112 and arranged opposite to the diode 116 of the circuit 20, the Zener diode 158, RC networks 160, 162 and 164 and resistor 166 connected to the line 110. The RC networks 162 and 164 are selectively shunted by the normally closed relay switches 94b and 66e. Thus, when a voltage of incorrect polarity appears across the lines 110 and 112, NPN transistor 168 is switched on. The base of transistor 168 is connected to the juncture between the resistor 166 and RC network 164 in parallel with the filter capacitor 170. When conductive, the transistor 168 conducts current from the positive terminal of battery 172 to line 110 through the emitter resistor 174 in order to supply a signal current through diode 176 and resistor 178 to the base of transistor 180, the potential of which relative to the emitter is established by the base resistor 182 and emitter resistor 184. The relay coil 94 associated with the polarity sensing circuit 22 is connected between the collectors of the transistors 168 and 180 in an arrangement similar to that described in connection with circuit 20 and is provided with series connected Zener diode 186 and resistor 188 for the same purposes. Thus, relay coil 94 will be energized when a voltage of incorrect polarity appears across the lines 110 and 112, opening normally closed relay switch 94b to remove the shunt from RC network 164 as well as to open the normally closed relay switches 94a and 94e associated with the constant voltage source 38. It will therefore be apparent, that as long as an input voltage is applied to the lines 110 and 112, ohmmeter operation will be prevented regardless of the polarity of the voltage. Further, whether or not the voltage applied is DC or AC, either or both of the relay coils 92 and 94 will be energized.

With continued reference to FIG. 3A, it will be observed that the voltage supply lines 110 and 112 are respectively connected to relay switches 190a and 190b associated with the relay coil 190 in the reversing switch assembly 34. When the relay coil 190 is deenergized, the voltage supply lines 110 and 112 are respectively connected to the terminals 30a and 30b through the relay switches 190a and 190b respectively engaging the contacts 192 and 194. Contact 192 is therefore connected to terminals 30a and contact 194 is connected to terminal 30b. On the other hand, when the relay coil 190 is energized, the relay switches 190a and 190b are displaced to their other operative positions engaging the contacts 196 and 198 so as to reverse the connections between the voltage supply lines 110 and 112 and the terminals 30a and 30b. The contact 196 is therefore connected to the terminal 30b while the contact 198 is connected to the terminal 30a. The relay coil 190 is connected to the battery 200 in series with the normally closed relay switch 92f and the normally open relay switch 94f. It will be apparent therefore, that whenever the polarity sensing circuit 20 detects AC voltage or DC voltage of the proper polarity, its relay coil 94 will open the relay switch 92f in order to prevent relay coil 190 from being energized. On the other hand, if voltage of an incorrect polarity is being detected by the polarity sensing circuit 22, its relay coil 94 will close the relay switch 94f in order to energize the relay coil 190. Thus, only when voltage of an incorrect polarity appears across the voltage supply lines 110 and 112 will the relay coil 190 be energized to reverse the connections between the voltage supply lines and the terminals 30a and 30b. Voltage of only the correct polarity will therefore be applied through the terminals 30a and 30b to the meter circuit 12 and the circuit components 14 and 26.

Referring now to FIG. 3B once again, it will be observed that voltage of a proper polarity will be applied across the voltage dividing network associated with the range control circuit 14 consisting of the RC sections 202, 204, 206, Zener diode 208, resistor 210 and diode 212. The RC sections 204 and 206 are selectively shunted by the normally closed relay switches 66a and 68a in order to automatically change the potential applied to the base of NPN transistor 214. The forward bias applied to the base of transistor 214 causing it to switch on is regulated by the Zener diode 208 in order to determine the firing point of the transistor, the base also being connected to filter capacitor 216 so that the transistor 214 may operate in a manner similar to that described in connection with the transistors 134 and 168 of the polarity sensing circuit except for the value of the firing voltage to which the transistor responds. Thus, the collector of transistor 214 is connected to the positive terminal of a battery 218 while its emitter is connected to the line 34 through emitter resistor 220 in order to produce an output signal at the emitter when the transistor is watched on. The transistor is arranged to be switched on when the voltage applied to the input terminals 10a and 10b of the system exceeds 50-volts, for example, constituting the upper limit of a low voltage range to be measured by the meter 28. Thus, the voltage range control circuit 14 is in a quiescent state while the input voltage being measured is in the low operating range. As soon as the voltage increases above the low range, an output signal appears at the emitter transistor 214 and is fed to the voltage sensing circuit through which the readout scale of the meter circuit is changed by selectively opening the relay switches 66c and 68c shunting the resistors 64 and 62 connected to the meter 28.

The output emitter of transistor 214 is connected through diode 222, resistor 224 and adjustable resistor 226 to the base of transistor 228 in the voltage sensing circuit 26. The output emitter of transistor 214 is also connected to the base of transistor 230 through the diode 232, and resistor 234. Base bias for the transistor 228 is established by the resistor 236 in parallel with the filter capacitor 238 while base bias for transistor 230 is established by the resistor 240 in parallel with filter capacitor 242. The emitter of transistor 228 is connected to the supply line 34 through emitter resistor 244 so that when the voltage appearing across the supply lines 32 and 34 is within the intermediate range, producing an output signal at the emitter of transistor 214, the transistor 228 is switched on in order to complete a circuit through the relay coil 66 connected between the collector of transistor 228 and the positive terminal of battery 218. When the relay coil 66 is energized, it opens the relay switch 66a in the voltage range control circuit 14 in order to add RC section 206 and prevent voltage build-up on the base of transistor 214. Relay switch 66c is also opened in the meter circuit 12 in order to remove the shunt by-passing resistor 64 thereby changing the readout scale of the meter 28. The normally opened relay switch 66b is also closed in order to establish a conductive path through the resistor 246 paralleling the resistors 224 and 226 so as to reduce the volt drop thereacross and insure that the transistor 228 remains conductive and the relay coil 66 energized. The relay coil 66 also closes the normally opened relay switch 66e connecting one terminal of the relay coil 68 to the positive terminal of the battery 218, conditioning the voltage sensing circuit for detection of voltages within the high voltage range of the meter. The voltage sensing circuit is thereby rendered sequentially operative to detect a rising voltage. The emitter of transistor 230 is connected through the emitter resistor 248 to the supply line 234 so that when the voltage appearing across the supply lines 32 and 34 is within the high voltage range, the transistor 230 is rendered conductive to complete an energizing circuit for the relay coil 68 through the previously closed relay switch 66e. When the relay coil 68 is energized, the normally closed relay switch 68a in the voltage range control circuit 14 is opened so as to open the shunt for the RC section 204 in order to add additional resistance in view of the increased voltage now appearing across the voltage supply lines. At the same time, the relay switch 68c in the meter circuit 12 is opened in order to add the resistor 62 again changing the readout scale of the meter for the high voltage range. The relay coil 68 when energized, also closes the normally opened relay switch 68b associated therewith in order to connect the resistor 250 in by-pass relation to the resistor 234 insuring that the transistor 230 remains conductive. The relay coils 66 and 68 will therefore become energized and deenergized at different points along an increasing and decreasing voltage variation curve to avoid premature changes in the readout scale of the meter. Also, energization of the relay coils 66 and 68 respectively open the relay switches 66e and 68f adding resistances in the polarity sensing circuits 22 and 20 in order to prevent excessive build-up of voltage on the bases of the transistors 168 and 134. The circuit control system therefore has a built-in protection against damage by excessive voltage.

It will be appreciated that the voltage sensing circuit 26 may be enlarged by additional stages in order to handle as many voltage ranges as desired. In order to prevent, however, supply of voltages exceeding the upper limit of the highest voltage range, the input terminal 10a is connected through the fuse 252 and the normally closed relay switch 254c to the supply line 110 while the terminal 10b is directly connected to the supply line 112 within the protective circuit 18 as shown in FIG. 3A. The relay switch 254c is therefore opened upon energization of the relay coil 254 in order to disconnect the source of voltage applied across the terminals 10a and 10b from the supply lines 110 and 112 when the voltage exceeds the upper limit of the high voltage range. One terminal of the relay coil 254 is therefore connected to the negative terminal of battery 256, the other terminal of the relay coil being connected through the relay switch 254a in its normal position, the resistor 258 and the Zener diodes 260 and 262 arranged in back to back relation to the voltage supply line 112, the Zener diodes being operative to set the proper current and voltage requirements for response of the relay 254. Thus, when an excessive voltage appears across the terminals 10a and 10b the relay coil 254 is energized displacing the relay switch 254a to its other operative position completing a holding circuit from the battery 256 through the relay coil and the normally closed reset switch 264. The relay coil 254 then remains energized holding the relay switch 254c opened to disconnect the voltage source from the supply lines until the reset switch 264 is opened. At the same time, energization of the relay coil 254 closes the normally opened relay switch 254b connecting the indicator lamp 266 across the battery 268. Illumination of the indicator lamp 266 will therefore signify that an excessive voltage has disconnected the system from the source of voltage being measured. Operation may be resumed by opening of the reset switch 264.

Figure 3C:
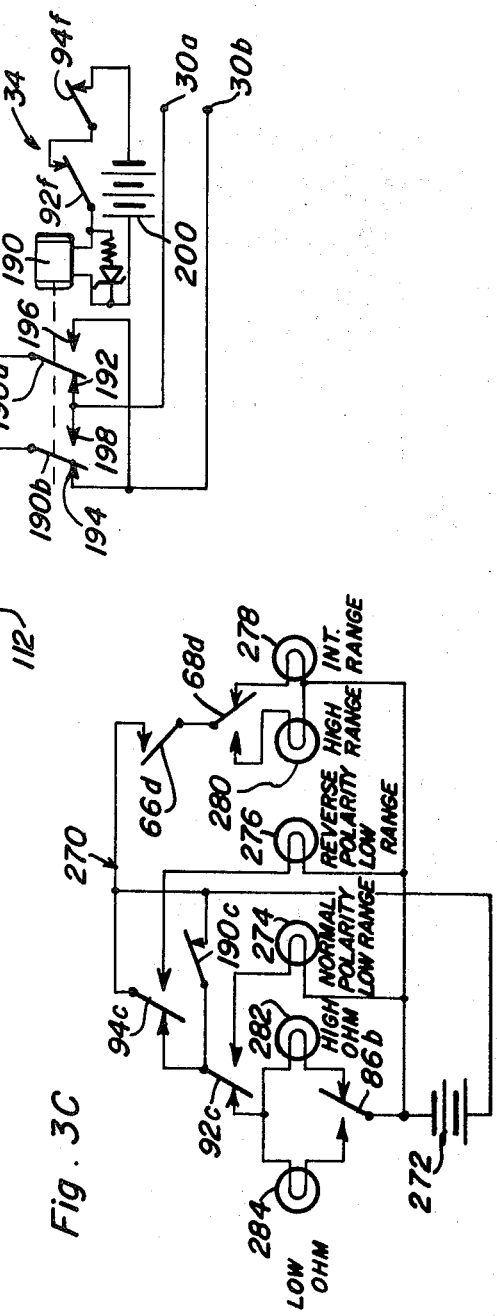

Also associated with the meter control system is an indicator circuit 270 as shown in FIG. 3C through which the system is operative to signify the readout scale under which the meter circuit is operating for both voltmeter and ohmmeter operation as well as the polarity of the voltage being measured. The indicator circuit includes a battery source of voltage 272 the negative terminal of which is connected to the low range indicator lamps 274 and 276, the intermediate range indicator lamp 278 and the high range indicator lamp 280. The positive terminal of the battery is connected to the relay switch 94c, the contact associated with the relay switch 66d and the contact associated with the normally closed relay switch 190c. Also, the negative terminal of the battery 274 is connected to the relay switch 86b displaceable between two operative positions alternatively connecting the negative terminal of the battery to the high and low ohm indicator lamps 282 and 284. The indicator lamps 282 and 284 have interconnected terminals connected to one of the contacts alternatively engaged by the relay switch 92c. The other contact of relay switch 92c is connected to the low range indicator lamp 274. The switch arm of relay switch 92c is connected to one of the contacts associated with the relay switch 94c and to the relay switch 190c. The low range indicator lamp 276 is also connected to one of the contacts associated with the relay switch 94c. Finally, the intermediate and high range indicator lamps 278 and 280 are respectively connected to the opposite contacts alternatively engaged by the relay switch 68d which in turn is connected to the relay switch 66d aforementioned. It will become apparent then, that during ohmmeter operation with a relatively high resistive load, the relay switches associated with the indicator circuit 270 will be in the positions illustrated in FIG. 3C so that an energizing circuit is completed from the negative terminal of battery 272 through relay switch 86b, high ohm indicator lamp 282, relay switch 92c and relay switch 94c to the positive terminal of the battery. Illumination of the high ohm indicator lamp 282 therefore signifies both ohmmeter operation and the readout scale range under which it is operating. When the scale is reduced during ohmmeter operation because of a low resistance, the relay coil 86 in the ohm control circuit 16 is deenergized causing the relay switch 86b in the indicator circuit to be displaced to the other operative position. A circuit is then completed through the low ohm indicator lamp 284. Should an input voltage appear across the input terminals of the system, volt meter operation automatically ensues. Assuming that the input voltage is of the correct polarity, and within the low voltage range, relay coil 92 is energized displacing the relay switch 92c to its other operating position from the position shown in FIG. 3C. An energizing circuit for the indicator lamp 274 is then completed from the negative terminal of battery 272 through the relay switch 92c, and the normally closed relay switch 196c to the positive terminal of the battery. On the other hand, if the low range voltage is of the incorrect or opposite polarity, then the relay switch 94c is displaced to its other operative position completing a circuit through the indicator lamp 276 from the negative terminal of the battery 272 through the relay switch 94c to the positive terminal of the battery, the relay coil 190 then being also energized to open the energizing circuit for the indicator lamp 274. The lamps 274 and 276 will therefore indicate the polarity of any DC voltage being measured and AC voltage when both are illuminated as well as operation within the low range if none of the other indicator lamps are illuminated. Should the voltage being measured be within the intermediate range, then a circuit is completed through the indicator lamp 278, the relay switch 68b and the relay switch 66b closed by energization of the relay coil 66 within the voltage sensing circuit. When the voltage reaches the high voltage range, the relay coil 68 is then also energized to displace the relay switch 68d to its other operative position opening the circuit to the indicator lamp 278 and completing instead a circuit through the indicator lamp 280.

From the foregoing description, the operation and arrangement of the meter control system of the present invention will be apparent. It will therefore be appreciated that the system of the present invention will not only function to measure voltage or resistance but will do so by automatically shifting from one type of operation to the other dependent upon the presence or removal of an input voltage at the input terminals of the circuit. Further, the circuit will automatically accommodate either AC or DC voltages. By placing a known resistance across the input terminals, the circuit could also be utilized to measure current. Thus, except for the connection of the resistor across the input terminals, the meter control circuit of the present invention may be utilized without modification as an AC-DC ammeter. The polarity of the current would also be indicated and automatic shifting in scales obtained upon proper change in the value of the current being measured. It should therefore be apparent that the meter control system of the present invention will provide an extremely versatile instrument for measuring different electrical characteristics in a reliable manner. The protective facilities hereinbefore described also render the system practical in connection with its multipurpose function.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a meter having opposite ends for measuring electrical values, an automatic control circuit for alternatively measuring different electrical characteristics comprising: a source of constant voltage having a pair of junctions, input means having opposite terminals adapted to be connected across an unknown resistive load or an unknown source of voltage, first unidirectional conducting means connected to the source of constant voltage at one of said junctions, second unidirectional conducting means connected in opposition to the first conducting means and connecting one of said terminals of the input means to said one of the junctions, voltage dividing means connected across the constant voltage source through said first conducting means, means connecting the other of said terminals of the input means to the voltage dividing means at the other of the junctions of the constant voltage source, means connecting one of the ends of the meter to the voltage dividing means intermediate said junctions and the other of the ends to the other of the junctions of the constant voltage source, means for sensing connection of the unknown voltage source across the input means, disabling means responsive to said sensing means for disconnecting the source of constant voltage from the first unidirectional conducting means, and switch means responsive to the sensing means for disconnecting said other of the ends of the meter from said other of the junctions and connecting said other of the meter ends to said one of the junctions between the first and second conducting means.

2. The combination of claim 1 including scale changing means for partially shunting said voltage dividing means.

3. The combination of claim 1 including a pair of polarity sensing circuits connected to the input means for respectively detecting voltages of opposite polarity from said unknown source of voltage, switching circuit means connecting said input means to the first unidirectional conducting means for reversing the flow of current thereto in response to detection of voltage polarity by only one of the polarity sensing circuits, voltage sensing means connected to said first unidirectional conducting means for detecting changes in voltage range, and means controlled by the voltage sensing means for changing the volt drops across the meter and the polarity sensing circuits in response to detection of a change in the voltage range.

4. The combination of claim 3 including indicator means for signifying the operating condition of the polarity and voltage sensing circuits and the disabling means.

5. In combination with a meter for measuring electrical values, an automatic control system for measuring AC or DC voltages comprising: a pair of input terminals adapted to be connected to an unknown source of voltage, a pair of polarity sensing circuits connected across said terminals for respectively detecting voltages of opposite polarity, unidirectional conducting means connected in series with said meter for conducting current to the meter in one direction only, said series connected unidirectional means and meter being connected across said terminals, and switching circuit means connected to said pair of polarity sensing circuits for reversing the terminal connected to the unidirectional conducting means and meter in response to detection of voltages by only one of the polarity sensing circuits, whereby AC voltages are rectified after being detected by the polarity sensing circuits.

6. The combination of claim 5 including voltage sensing means connected across said terminals for sensing connection of said unknown source of voltage to the polarity sensing circuits, and scale changing means operatively connected to the meter for changing the volt drop thereacross in response to detection of predetermined voltages by the voltage sensing means.

7. The combination of claim 6 including resistance measuring circuit means connected to the meter.

8. The combination of claim 7 wherein said resistance measuring circuit means includes: a source of constant voltage, second unidirectional conducting means connected to the source of constant voltage for conducting current to the meter in a direction opposite to said one direction relative to said input terminals, voltage dividing means connected to the meter and in series with said second unidirectional conducting means for changing the volt drop across the meter in response to a reversal in current therethrough, and disabling means responsive to flow of current through the meter in said one direction for disconnecting the source of constant voltage from the second unidirectional conducting means.

9. The combination of claim 5 including voltage sensing means connected to the unidirectional conducting means and scale changing means operatively connected to the meter for changing the volt drop thereacross in response to detection of predetermined voltages by the voltage sensing means.

10. The combination of claim 9 wherein each of said polarity sensing circuits includes a voltage dividing network connected to said input terminals, relay means connected to said voltage dividing network for energization in response to a relatively low unidirectional voltage, and means for increasing the resistance of the voltage dividing network in response to relatively higher voltages by the voltage sensing means.

11. In combination with a current measuring meter, an automatic measuring system including a pair of voltage supply lines, voltage dividing means connected across said voltage supply lines having series connected branches, the meter being connected to the voltage dividing means between said branches and one of said branches conducting current in one direction only between the voltage supply lines, a pair of input terminals, one of the input terminals being connected to one of the voltage supply lines, unidirectional conducting means connecting the other of the input terminals to the other of the voltage supply lines, a source of constant voltage, switch means connected to the meter for selectively conducting current in one direction between the voltage supply lines through the meter and said one of the branches of the voltage dividing means during ohmmeter operation and in the opposite direction through the meter and the other of the branches during voltmeter operation, and means for connecting the constant source of voltage across the voltage supply lines during said ohmmeter operation while a load is connected across the input terminals, a source of unknown voltage being connected across the input terminals during said voltmeter operation.

References Cited

UNITED STATES PATENTS

| | | | |
|---|---|---|---|
| 1,494,625 | 5/1924 | Pierce | 324—29.5 X |
| 1,954,311 | 4/1934 | Fausett | 324—29.5 X |
| 2,885,637 | 5/1959 | Triman | 324—65 |
| 3,217,225 | 11/1965 | Gottlieb et al. | 324—29.5 X |
| 3,399,349 | 8/1968 | Davis | 324—115 |
| 2,497,961 | 2/1950 | Shaw | 324—115 XR |
| 2,865,000 | 12/1958 | Newell | 324—115 |
| 3,237,102 | 2/1966 | Newell | 324—115 |

OTHER REFERENCES

Willhnganz, E.: A Bridge For Measuring Lead Storage Battery Resistance, in the Electrochemical Society, paper presented at seventy-ninth general meeting, Apr. 17 1941, pp. 255–260.

Kistler: "Precision Voltohmmeter," Hewlett-Packard Journal, vol. 17, No. 1, September 1965, pp. 1–7.

EDWARD E. KUBASIEWICZ, Primary Examiner

U.S. Cl. X.R.

324—73, 110, 115